United States Patent
Wagner et al.

(10) Patent No.: US 8,170,860 B2
(45) Date of Patent: May 1, 2012

(54) METHOD AND DEVICE FOR EMULATING CONTROL AND/OR REGULATING FUNCTIONS OF A CONTROL OR REGULATING DEVICE

(75) Inventors: Horst Wagner, Stuttgart (DE); Volker Stuerzl, Stuttgart (DE); Guenter Schöneck, Stuttgart (DE); Gerda Breitenbach, legal representative, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 1673 days.

(21) Appl. No.: 10/257,802

(22) PCT Filed: Feb. 9, 2002

(86) PCT No.: PCT/DE02/00480
§ 371 (c)(1),
(2), (4) Date: Apr. 16, 2003

(87) PCT Pub. No.: WO02/065220
PCT Pub. Date: Aug. 22, 2002

(65) Prior Publication Data
US 2003/0171905 A1    Sep. 11, 2003

(30) Foreign Application Priority Data
Feb. 13, 2001    (DE) .................................. 101 06 504

(51) Int. Cl.
*G06F 9/455*     (2006.01)
*G06F 11/00*    (2006.01)
(52) U.S. Cl. ................. 703/23; 703/28; 714/28

(58) Field of Classification Search .......... 703/23, 703/28; 714/28
See application file for complete search history.

(56) References Cited

U.S. PATENT DOCUMENTS

| 5,079,731 | A | | 1/1992 | Miller et al. |
|---|---|---|---|---|
| 5,214,582 | A | * | 5/1993 | Gray ............................... 701/33 |
| 5,357,518 | A | * | 10/1994 | Peter ................................. 714/4 |
| 5,523,948 | A | * | 6/1996 | Adrain ........................... 701/99 |
| 5,752,008 | A | | 5/1998 | Bowling |
| 5,761,456 | A | * | 6/1998 | Titus et al. .................... 710/305 |
| 5,826,060 | A | | 10/1998 | Broderick et al. |
| 6,311,149 | B1 | * | 10/2001 | Ryan et al. ..................... 703/21 |
| 6,708,290 | B2 | * | 3/2004 | Swoboda et al. .............. 714/30 |
| 6,738,929 | B2 | * | 5/2004 | Swoboda et al. .............. 714/28 |

FOREIGN PATENT DOCUMENTS

| DE | 33 18 410 | 11/1984 |
|---|---|---|
| DE | 39 17 979 | 12/1990 |
| EP | 0 879 675 | 11/1998 |
| FR | 2 767 395 | 2/1999 |
| JP | 11 272310 | 10/1999 |

* cited by examiner

*Primary Examiner* — Dwin M Craig
*Assistant Examiner* — Aniss Chad
(74) *Attorney, Agent, or Firm* — Kenyon & Kenyon LLP

(57) ABSTRACT

A method and an emulation device for emulating control and/or regulating functions of a control or regulating unit, in particular of a motor vehicle. For emulation, the functions are swapped out into an external emulation computer, a data circuit is produced before the beginning of the emulation via a software interface of the emulation computer and a software interface of the control/regulating unit. In order to significantly accelerate the development and programming of new control/regulating functions of the control/regulating unit, the software interfaces are configured for the emulation of different control/regulating functions before the beginning of the emulation without changing the software.

19 Claims, 2 Drawing Sheets

METHOD AND DEVICE FOR EMULATING CONTROL AND/OR REGULATING FUNCTIONS OF A CONTROL OR REGULATING DEVICE

FIELD OF THE INVENTION

The present invention relates to a method of emulating control and/or regulating functions of a control and/or regulating unit, in particular of a motor vehicle. The emulation is performed by swapping out the functions into an external emulation computer. A data circuit is produced before the beginning of the emulation via a software interface of the emulation computer and a software interface of the control/regulating unit.

The present invention also relates to an emulation device, which includes a control or regulating unit, in particular of a motor vehicle, and an external emulation computer. The emulation device is used for emulating control and/or regulating functions of the control/regulating unit by swapping out the functions into the emulation computer. The control/regulating unit and the emulation computer each include a software interface and the control/regulating unit and the emulation computer are linked to one another via a data circuit which may be produced via the software interfaces before the beginning of the emulation.

Furthermore, the present invention relates to a memory element for a control or regulating unit of a motor vehicle. A computer program is stored on the memory element which is executable on a computing element, in particular on a microprocessor. The memory element is implemented in particular as a read-only memory, as a random access memory, or as a flash memory. Finally, the present invention also relates to a computer program.

BACKGROUND INFORMATION

Emulation devices for emulating control/regulating functions of a control/regulating unit are used as prototyping tools in the development and/or the software implementation of new control/regulating functions. Such an emulation device is also referred to as a bypass. With the aid of the bypass, functions of an arbitrary control/regulating unit (ECU, electronic control unit) may be swapped out into an external emulation computer. The communication between the control/regulating unit and the emulation computer occurs via a data circuit, which is implemented, for example, as a bus line, in particular as a controller area network (CAN) bus line. For the purpose of communication, a software interface is provided in both the control/regulating unit and the emulation computer.

A method of emulating functions of a control unit of the type initially discussed in German Published Patent Application No. 33 18 410. New control/regulating programs may be developed easily in higher programming languages on high-performance emulation computers, through which rapid development of the software functions is provided (rapid prototyping). To test the newly programmed functions, the emulation computer is linked via the data circuit to a control/regulating unit for which the functions were developed. The new functions are emulated on the emulation computer while the remaining parts of the control/regulating program run on the control/regulating unit. Therefore, a standard control unit may be used even in the development phase of new software functions, so that experiments with newly programmed functions run especially close to the standard manner.

Before the beginning of an emulation, the data circuit between the emulation computer and the control unit is produced via the software interfaces. During an initialization phase of the emulation computer, it transmits specific data of the functions to be emulated in accordance with a permanently preselected transmission protocol. This data is stored in tables provided for this purpose in the control unit. In bypass operation, the communication from the control unit to the emulation computer is initiated by fixed trigger events. The type of communication between the control unit and the emulation computer is defined by the data stored in the tables.

An emulation device of the type initially cited is discussed in German Published Patent Application No. 39 17 979. In this case, a bypass is discussed which uses a standardized hardware interface on a control unit for producing the data circuit. During bypass operation, the control unit accesses either a read/write memory of the emulation device, in which the function to be emulated is stored, or a read memory of the control unit, on which the actual program execution of the control/regulating program is stored. After a trigger event is initiated, the control/regulating program is no longer executed on the microprocessor of the control/regulating unit, but rather this switches over to the read/write memory of the emulation device and executes the function to be emulated.

In the present application, reference is expressly made to German Published Patent Application No. 33 18 410 and German Published Patent Application No. 39 17 979.

In other methods and devices for emulating functions of a control/regulating unit, the interfaces of the control/regulating unit and the emulation computer are aligned to the functions to be emulated and are defined correspondingly (either through fixed programming of the software interfaces or through a fixed hardware configuration of the hardware interfaces). In particular, the protocol for data transmission between the emulation computer and the control/regulating unit is permanently preselected during bypass operation. Therefore, for example, the size of the tables, the word length of the transmitted configuration data, the timing code for the data transmission, and statements about whether operation occurs with or without monitoring of the data circuit may only be adjusted to new control/regulating functions to be emulated by complicated reprogramming of the software interfaces. The possibilities of rapid prototyping are significantly restricted by these necessary changes of the software at the interfaces.

SUMMARY OF THE INVENTION

It is an object of the present invention to provide for acceleration of the development and programming of new control/regulating functions of a control/regulating unit.

To achieve this object, the exemplary method of the present invention provides, on the basis of the method of emulating control/regulating functions of the type initially cited, that the software interfaces are configured for the emulation of different control/regulating functions before the beginning of the emulation without changing the software.

According to the exemplary embodiment of the present invention, the software interfaces are therefore freely programmable, so that a protocol for data transmission between the control/regulating unit and the emulation computer may be adjusted to the particular control/regulating functions to be emulated. The adjustment is performed without reprogramming of the software interfaces. In this manner, new possibilities open up within the framework of rapid prototyping for the development and programming of new control/regulating functions of a control/regulating unit.

To configure the software interfaces, configuration data is transmitted from the emulation computer to the control/regulating unit via the data circuit before the emulation of control/regulating functions. The configuration data includes, for example, the size of the tables in which data for defining the functions to be emulated is stored, the word lengths of the data, the timing code in which the control/regulating program runs, and statements about whether or not the data circuit will be monitored during bypass operation. The timing code may either be permanently preselected or event-oriented. The configuration data is used for specifying the transmission protocol for the data transmission and for configuring the software interfaces.

According to an exemplary embodiment of the present invention, software interfaces are configured for the emulation of different control/regulating functions from a preselectable set of measured and intervention variables. Therefore, the data suitable for the current function to be emulated is selected from an already existing library including various configuration data and the software interfaces are programmed accordingly.

According to an exemplary embodiment of the present invention, the resources for the data circuit and the resources of a read/write memory of the control/regulating unit are dynamically managed in accordance with the interface configuration. Therefore, a type of allocation layer is introduced, which redirects the accesses to the data stored in the tables to the appropriate table and the appropriate table position. By defining this allocation layer before the beginning of the emulation, the size of the tables and the word lengths of the data stored therein may be selected variably and/or adjusted to the interface configuration.

According to another exemplary embodiment of the present invention, the configuration is defined on the emulation computer and the configuration data is transmitted to the control/regulating unit via the data circuit before the beginning of the emulation. How the software interfaces of the emulation computer and the control/regulating unit are to be configured is also defined in the course of programming the function to be emulated on the emulation computer in a higher programming language. Before the beginning of the emulation, the configuration data is then transmitted to the control/regulating unit.

The configuration data is transmitted to the control/regulating unit during an initialization phase of the emulation computer.

To achieve the object of the exemplary embodiment of the present invention, it is provided, on the basis of the emulation device of the type initially cited, that the software interfaces be configurable for the emulation of different control/regulating functions before the beginning of the emulation, without changing the software.

According to an exemplary embodiment of the present invention, it is suggested that the data circuit is implemented as a serial bus system, in particular as a controller area network (CAN) bus.

The implementation of the exemplary method according to the present invention in the form of a memory element which is provided for a control/regulating unit of a motor vehicle is of particular significance. A computer program is stored on the memory element which is executable on a computing element, in particular on a microprocessor of the control/regulating unit, and is suitable for performing the exemplary method according to the present invention. In this case, the present invention is therefore implemented by a computer program stored on a memory element, so that this memory element provided with the computer program represents the present invention in the same manner as the method which the computer program is suitable for executing. An electrical memory medium may, in particular, be used as a memory element, for example, a read-only memory, a random access memory, or a flash memory.

The present invention also relates to a computer program which is suitable for performing the exemplary method according to the present invention when it is executed on a computing element, in particular on a microprocessor. In particular, it the computer program may be stored on a memory element, in particular on a flash memory.

DETAILED DESCRIPTION

Figure 1:
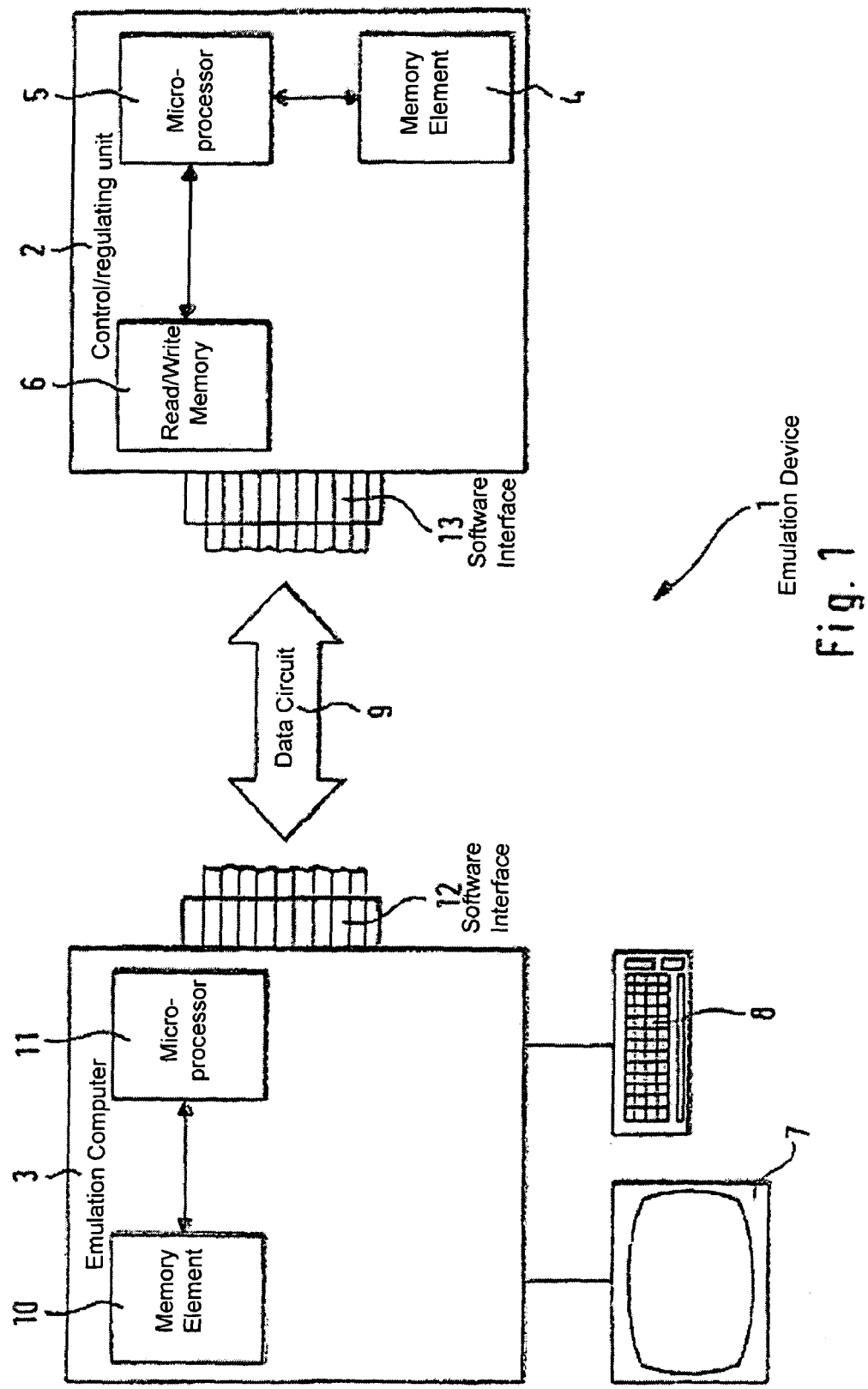
FIG. 1 shows a block diagram of an emulation device according to the present invention according to an exemplary embodiment.

In FIG. 1, an exemplary emulation device according to the present invention is indicated as a whole with reference number 1. Emulation device 1 includes a control or regulating unit 2 of a motor vehicle and an external emulation computer 3. Emulation device 1 is used as a prototyping tool for rapid prototyping of software. Control/regulating unit 2 is used for control/regulation of specific functions of a motor vehicle, for example, the internal combustion engine, the steering, the brakes, the transmission, and/or the road holding of the motor vehicle. Control/regulating unit 2 includes a memory element 4, on which a control/regulating program is stored. Memory element 4 is implemented as a flash memory, for example. The control/regulating program is executable on a microprocessor 5. During the program execution, data is read out of and/or stored in a read/write memory 6. Control/regulating unit 2 fulfills the control/regulating task assigned to it by executing the control/regulating program.

Emulation computer 3 includes a display screen 7 and alternatively further output devices and a keyboard 8 and alternatively further input devices. New or altered control/regulating functions of the control/regulating program are programmed on emulation computer 3. To test the newly programmed functions in bypass operation, emulation computer 3 is first connected to control/regulating unit 2 via a data circuit 9. Data circuit 9 is implemented as a controller area network (CAN) bus line.

During bypass operation, the control/regulating program is executed on control/regulating unit 2. As soon as a trigger event is initiated during the program execution, the control/regulating program function modeled in emulation computer 3 is called and executed. The emulation computer includes a further memory element 10, on which the control/regulating function to be emulated is stored. To execute the function, emulation computer 3 includes a microprocessor 10. Before or during the execution of the program function, data is read out of read/write memory 6 of control/regulating unit 2 via data circuit 9 and, after the program execution, stored in this memory.

After the execution of the program function in emulation computer 3, the execution of the control/regulating program in control/regulating unit 2 is returned to.

Alternatively, the regulating program in control/regulating unit 2 and the program function in emulation computer 3 may also run parallel to one another. In this manner, a newly developed control/regulating program function may be executed on a standard control/regulating unit 2 even in the development phase, which may allow testing which is especially close to standard.

A freely configurable software interface 12, 13 is implemented on both emulation computer 3 and control/regulating unit 2 for controlling and coordinating the communication between emulation computer 3 and control/regulating unit 2. Together with the programming of the control/regulating function, configuration data for configuring software interfaces 12, 13 is also developed. The configuration data suitable for the current function to be emulated may, for example, be taken from an existing library including different configuration data. Through the free configuration of software interfaces 12, 13, a protocol for the data transmission between control/regulating unit 2 and emulation computer 3 may be adjusted to the particular control/regulating functions to be emulated. Complicated reprogramming of the software interfaces to emulate different functions is no longer necessary.

The configuration data includes, for example, the size of tables in which data for defining the functions to be emulated is stored, the word lengths of the data, the timing code in which work is done, and statements about whether or not data circuit 9 will be monitored during bypass operation. The tables are stored in read/write memory 6. According to the present invention, the accesses to the data stored in the tables are redirected to the appropriate tables and the appropriate table positions using an allocation layer.

Before the beginning of the emulation of the newly programmed functions in emulation computer 3, the configuration data is transmitted to control/regulating unit 2 via data circuit 9 during an initialization phase of emulation computer 3, and software interfaces 12, 13 are configured accordingly. During the initialization, the hardware interfaces (CAN) are also initialized and/or configured in accordance with the configuration.

Figure 2:
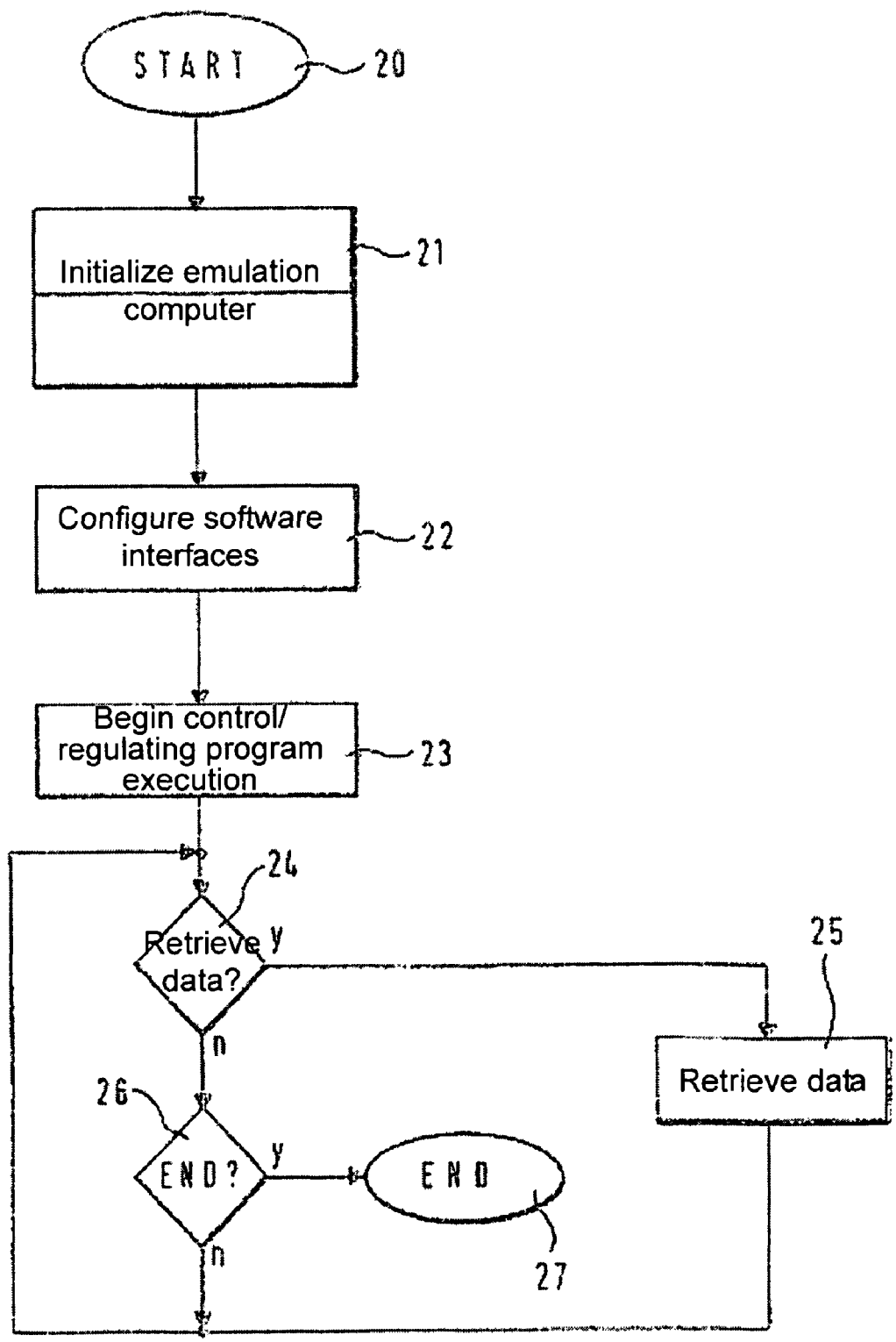
FIG. 2 shows a flow chart of an emulation method according to the present invention according to an exemplary embodiment.

The exemplary method according to the present invention for bypass operation of a control/regulating unit 2 of a motor vehicle is described in the following with reference to FIG. 2. The method begins in a function block 20. This is followed by initialization of emulation computer 3 in function block 21. In the course of the initialization, the configuration data is also transmitted to control/regulating unit 2. In a function block 22, software interfaces 12, 13 are then configured in accordance with the configuration data.

The execution of the control/regulating program in control/regulating unit 2 is then begun in a function block 23. The control/regulating program may also be started even before the interface initialization (function block 22). The calculation on emulation device 1 is started by a trigger. The trigger events are defined via the configuration of software interfaces 12, 13 in function block 22. After the execution of the control/regulating program and/or of the control/regulating function, control/regulating unit 2 and emulation computer 3 write the results in read/write memory 6.

In a query block 24, it is checked whether data is to be retrieved from read/write memory 6 during the program execution. If yes, data is retrieved from read/write memory 6 in function block 25. Subsequently, the execution of the control/regulating program in control/regulating unit 2 is returned to and query block 24 is branched to.

If there is no more data to be retrieved from read/write memory 6, it is checked in a query block 26 whether the control/regulating program has ended. If yes, it is ended in a function block 27. Otherwise, execution of the control/regulating program is continued in control/regulating unit 2 and query block 24 is branched to.

What is claimed is:

1. A method of a control arrangement of a motor vehicle, the method comprising:
   executing, by a processor of a regulating device, a regulating program to control functions of the motor vehicle;
   during the execution and responsive to a trigger event, calling a regulating function modeled in an emulation computer;
   responsive to the calling, executing, by a processor of the emulation computer, the modeled regulating function;
   one of before and during the execution of the modeled regulating function, reading out data from a memory of the regulating device and transmitting the read data to the emulation computer;
   after the execution of the modeled regulating function:
      transmitting data from the emulation computer to the memory of the regulating device; and
      continuing, by the processor of the regulating device, the execution of the regulating program; and
   adjusting a protocol for the data transmission between the regulating device and the emulation computer, the adjustment (a) being dependent on the modeled regulating function being called, and (b) being performed using configuration data;
   wherein the configuration data is used for configuring software interfaces between the regulating device and the emulation computer.

2. The method of claim 1, wherein, based on the modeled regulating function to be executed by the processor of the emulation computer, the configuration data is selected by selecting from a set of variables of a library.

3. The method of claim 2, wherein resources for a data circuit connecting the regulating device and the emulation computer and resources of the memory of the regulating device are dynamically managed in accordance with the configuration of the software interfaces.

4. The method of claim 1, wherein the configuration of the software interfaces is defined on the emulation computer.

5. The method of claim 1, further comprising:
   transmitting the configuration data from the emulation computer to the regulating device during an initialization phase of the emulation computer in order to configure the software interfaces.

6. The method of claim 1, wherein, based on the modeled regulating function to be executed by the processor of the emulation computer, the configuration data is selected from a library that includes a plurality of configuration data.

7. The method of claim 6, wherein the selected configuration data defines a size of a table of the memory of the regulating device and in which data is to be stored.

8. The method of claim 6, wherein the selected configuration data defines a data word length.

9. The method of claim 6, wherein the selected configuration data defines a timing in which processing is performed.

10. The method of claim 6, wherein the selected configuration data defines whether a data circuit, by which the regulating device and the emulation computer are connected to each other, will be monitored.

11. The method of claim 1, wherein the executing of the regulating program is begun prior to the configuration of the software interfaces.

12. The method of claim 1, wherein, based on the modeled regulating function to be executed by the processor of the emulation computer, the configuration data is selected by selecting from a set of variables of a library.

13. The method of claim 1, wherein the adjusting of the protocol includes defining an allocation layer to which accesses of the memory of the regulating device are directed, the allocation layer redirecting the accesses to portions of the memory.

14. The method of claim 1, wherein the configuration data is defined using the emulation computer.

15. A control arrangement of a motor vehicle, the control arrangement comprising:
   a regulating device that is configured to execute a regulating program to control functions of the motor vehicle and that includes a first software interface;
   an emulation computer that includes a second software interface, the first and second software interfaces being configured to interface between the regulating device and the emulation computer; and
   a data circuit to link the regulating device and the emulation computer;
   wherein:
      the regulating device is configure to, during the execution of the regulating program and responsive to a trigger event, call a regulating function modeled in the emulation computer;
      the emulation computer is configured to execute the modeled regulating function;
      the control arrangement is configured such that:
         one of before and during the execution of the modeled regulating function, data is read from a memory of the regulating device and transmitted to the emulation computer; and
         after the execution of the modeled regulating function:
            data is transmitted from the emulation computer to the memory of the regulating device; and
            the regulating device continues the execution of the regulating program;
      a protocol for the data transmission between the regulating device and the emulation computer is adjusted;
      the adjustment is (a) dependent on the modeled regulating function being called and (b) performed using configuration data; and
      the configuration data is used for configuring the first software interface and the second software interface.

16. The control arrangement of claim 15, wherein the data circuit is implemented as a serial bus system.

17. The control arrangement of claim 15, wherein the serial bus system includes a controller area network bus.

18. A hardware computer-readable medium having stored thereon instructions executable by a processor, the instructions which, when executed by the processor, cause the processor to perform a method for controlling a motor vehicle, the method comprising:
   executing a regulating program to control functions of the motor vehicle;
   during the execution and responsive to a trigger event, calling a regulating function modeled in an external emulation computer, wherein, responsive to the calling, the external emulation computer executes the modeled regulating function;
   one of before and during the execution of the modeled regulating function, reading out data from a memory of the regulating device and transmitting the read data to the external emulation computer;
   after the execution of the modeled regulating function:
      storing data received from the external emulation computer in the memory of the regulating device; and
      continuing the execution of the regulating program; and
   adjusting a protocol for the data transmission between the regulating device and the emulation computer, the adjustment (a) being dependent on the modeled regulating function being called, and (b) being performed using configuration data;
   wherein the configuration data is used for configuring a software interface between the regulating device and the emulation computer.

19. The computer-readable medium of claim 18, wherein the computer-readable medium includes one of a read-only memory, a random access memory and a flash memory.

* * * * *